United States Patent

[11] 3,572,680

| [72] | Inventor | Frederick R. Neff |
| | | 2993 Curtis Ave. D26, Des Plaines, Ill. 60018 |
| [21] | Appl. No. | 716,958 |
| [22] | Filed | Mar. 28, 1968 |
| [45] | Patented | Mar. 30, 1971 |

[54] MACHINE TOOL TABLE
10 Claims, 11 Drawing Figs.

[52] U.S. Cl.................................................. 269/8,
269/82, 90/58, 51/240, 77/64
[51] Int. Cl....................................................... B25b 11/00
[50] Field of Search......................................... 51/240;
77/63, 64; 269/8, 71, 72, 73, 82; 90/58

[56] References Cited
UNITED STATES PATENTS

| 2,421,716 | 6/1947 | Rose............................... | 269/8X |
| 2,791,136 | 7/1953 | Smith............................. | 77/64 |
| 3,267,772 | 8/1966 | Burg.............................. | 77/64 |
| 3,410,176 | 11/1968 | Van Straaten................ | 77/63X |

*Primary Examiner*—Andrew R. Juhasz
*Assistant Examiner*—Donald D. Evenson
*Attorney*—Mason, Kolehmainen, Rathburn & Wyss ABSTRACT: There is provided a machine tool table adapted for multiple positioning in a horizontal plane. The table includes a base member, an intermediate table member mounted for movement in a first horizontal direction on the base member, and an upper table member mounted for horizontal movement on the intermediate table member in a second or transverse horizontal direction. Locating means are provided for positioning the upper table member in a plurality of positions relative to the intermediate table. Moreover there is provided electromagnetic means for securely locking the upper table member relative to the intermediate table member in each of the selected plurality of positions.

Patented March 30, 1971
3,572,680
3 Sheets-Sheet 1
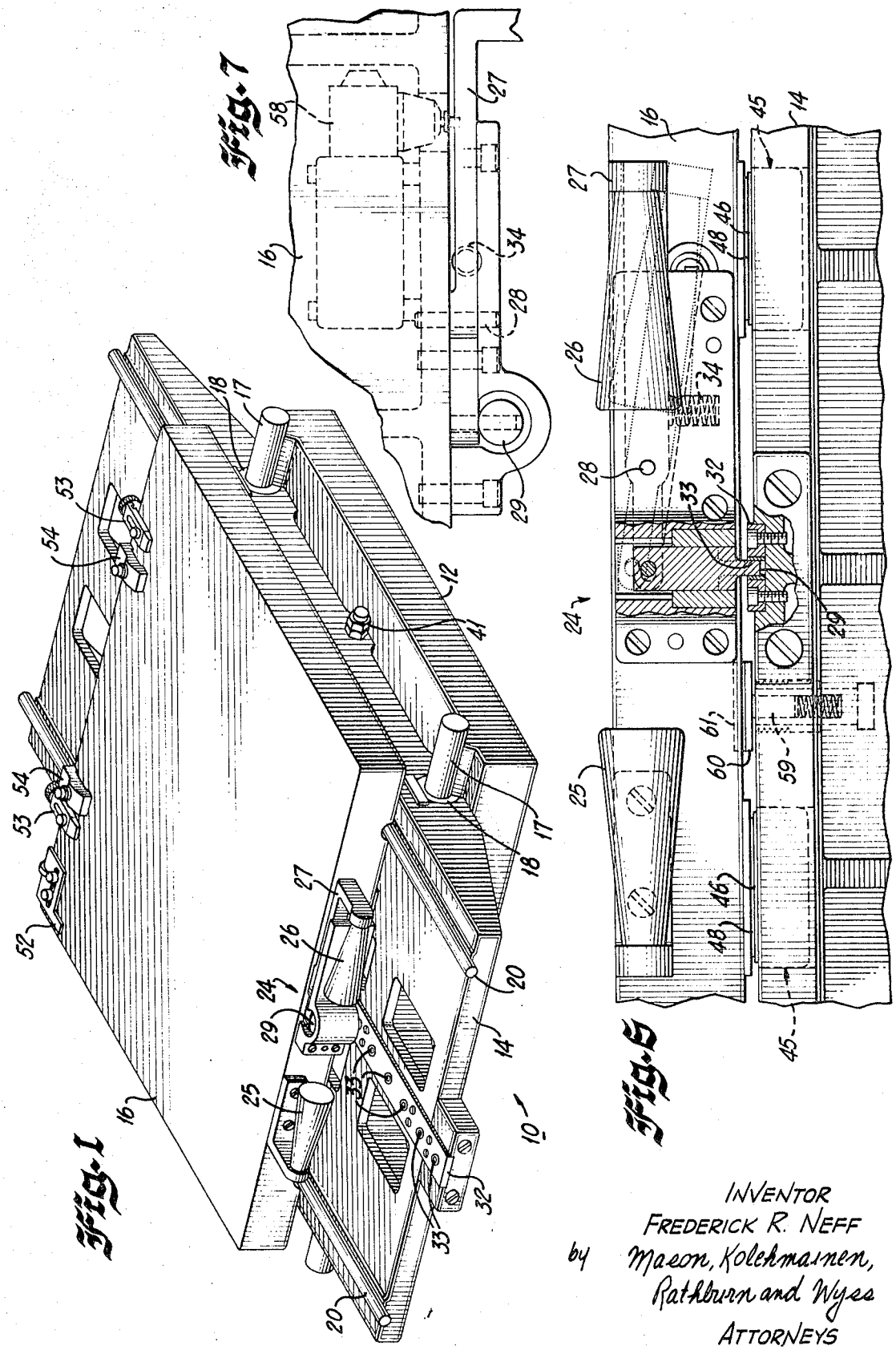
INVENTOR
FREDERICK R. NEFF
by Mason, Kolehmainen,
Rathburn and Wyss
ATTORNEYS

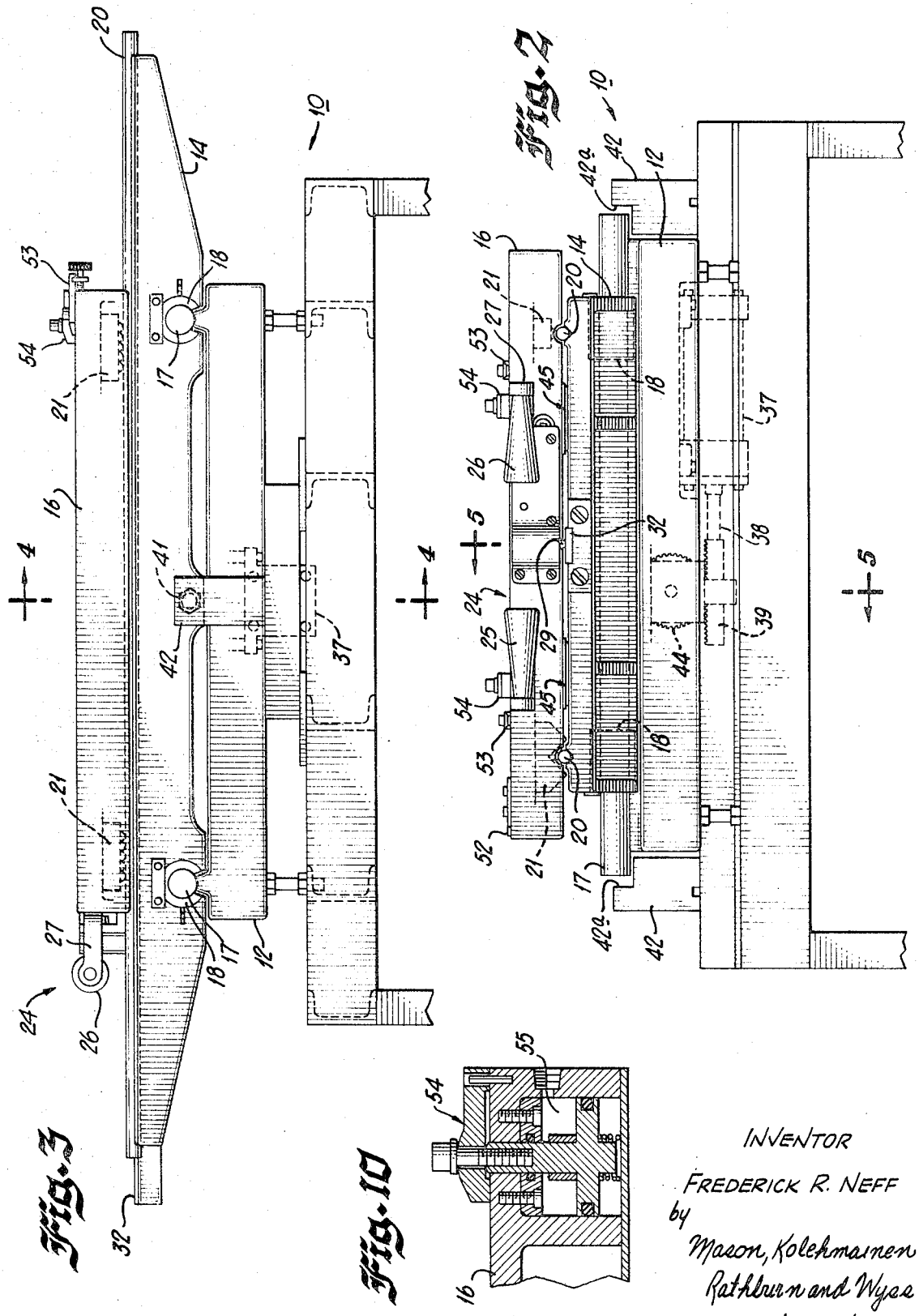

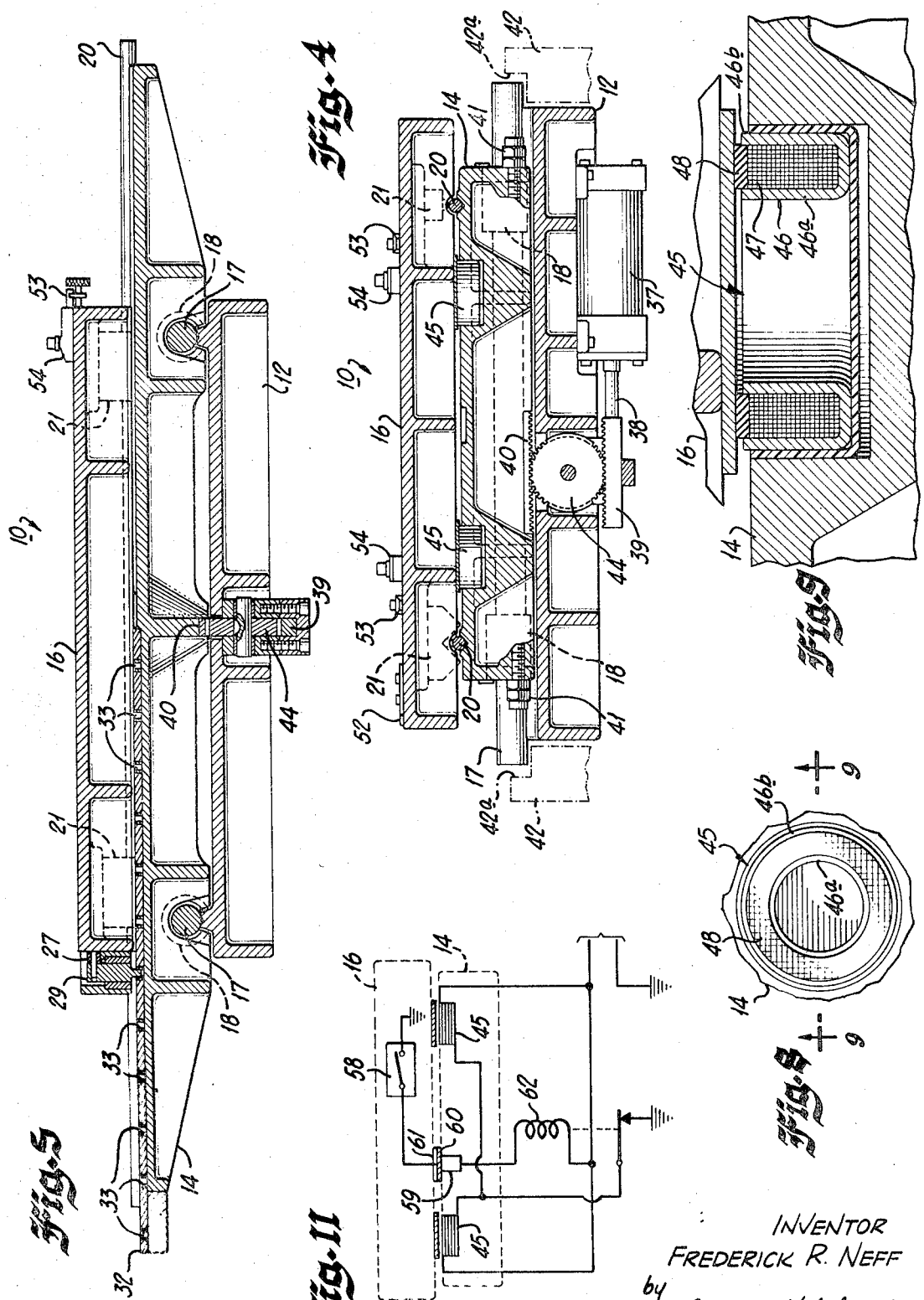

MACHINE TOOL TABLE

This invention relates to a machine tool table adapted for multiple positioning in a horizontal plane, particularly to a machine tool table such as would be used with a multispindle production machine or the like.

It is sometimes desirable in the machine tool field to provide for indexing of a workpiece relative to the machine tool axis in one or more horizontal positions, and to provide the indexing movement in a rapid and quick manner with accurate alignment of the workpiece in the desired position. Conventionally this has been accomplished in a handtool by a handcrank table; in an automatic tool by complex electronic circuitry. Both of these methods have certain disadvantages. The handcrank alignment is both slow and requires a high degree of efficiency by the operator. The automatic method is expensive and adapted primarily to high-production work. Moreover there are available machine tool tables which may be moved manually in a horizontal plane. Such tools are also subjected to certain disadvantages. For example certain machining operations exert considerable horizontal thrust on the worktable. Accordingly it is necessary that the table be locked securely in place during the machining operation.

It is therefore an object of the present invention to provide a new and improved machine tool table for use with a vertical grinding machine, drill press and the like, and which may be indexed to a plurality of horizontal positions in one or more horizontal directions.

Yet another object of the present invention is to provide a new and improved machine tool table.

Yet a further object of the present invention is to provide a machine tool table which may be quickly and securely locked in each of its selected positions with a minimum of proficiency required by the operator thereof.

Further objects and advantages of the present invention will become apparent as the following description proceeds and the features of novelty which characterize the invention will be pointed out with particularity in the claims annexed to and forming a part of this specification.

In accordance with these and many other objects of the present invention there is provided a new and improved machine tool table adapted for multiple positioning in a horizontal plane. The machine tool table includes a base member provided with guide means on its upper surface, an intermediate table member having guide elements on its lower surface cooperatively associated with the guide means to provide for horizontal movement thereof in a first horizontal direction and further provided with guide means on its upper surface transverse to the guide means on the base member. An upper table is provided having guide elements on its lower surface cooperatively associated with a guide track on the intermediate table member which provide horizontal movement thereof in a second horizontal direction. Stops are provided for limiting the travel of the intermediate table member. A locating arrangement which may consist of a pin insertable into locating apertures is provided for the upper table. Magnetic means interacting between the two tables is provided to securely lock the upper table fixed relative to the intermediate table in each of its plurality of positions.

For a better understanding of the invention reference may be had to the accompanying drawings wherein:

FIG. 1 is a perspective view of the machine tool table according to the present invention;

FIG. 2 is a front view of the machine tool table of FIG. 1;

FIG. 3 is a side view of the machine tool table of FIG. 1;

FIG. 4 is a cross-sectional front elevational view of the machine tool table of FIG. 1, taken along line 4-4 of FIG. 3;

FIG. 5 is a cross-sectional elevational side view of the machine tool table of FIG. 1, taken along line 5-5 of FIG. 2;

FIG. 6 is a fragmentary enlarged front elevational view of the machine tool table of FIG. 1, illustrating in detail the locating mechanism of the top table;

FIG. 7 is a fragmentary top view of the machine tool table illustrating part of the control mechanism thereof;

FIG. 8 is a top sectional view of a machine tool table illustrating one of the locking magnets thereof;

FIG. 9 is an enlarged cross-sectional view of the locking magnet of FIG. 8;

FIG. 10 is a fragmentary cross-sectional view illustrating one of the holddown devices of the table of FIG. 1; and FIG. 11 is a schematic illustration of a suitable wiring diagram for the control of the work table.

Referring now to the drawings, there is illustrated in FIGS. 1, 2 and 3 a machine tool table generally illustrated at 10 in accordance with the present invention. The machine tool table 10 includes a base member 12, an intermediate table 14 and an upper table 16. The base member 12 is provided with a pair of transverse guide tracks 17 so that the intermediate table 14 rides on the guide tracks 17 through suitable guide elements or bearings 18. Thus the intermediate table 14 will move freely from left to right along the guide tracks 17. The intermediate table 14 is also provided with a pair of parallel spaced guide tracks 20 and the upper table 16 is provided with guide elements or bearings 21. The guide tracks 20 on the intermediate table 14 are transverse to the guide tracks 17 on the base member 12, running generally fore and aft, to provide for movement of the upper table 16 fore and aft relative to the intermediate table 14. Thus the upper table 16 has complete freedom of movement in both horizontal directions by virtue of the two sets of cooperating guide tracks and guide elements 17, 18 and 20, 21.

To provide for positioning of the upper table 16 in a selected fore-and-aft position, the upper table 16 is provided with a handle assembly, generally illustrated at 24 including a fixed handle 25 and a pivotally mounted movable handle 26. The movable handle 26 is pivoted with a handle bracket 27, FIG. 6, about a pivot 28 and is adapted to raise and lower a locating pin 29. To provide for locating the fore-and-aft position of the upper table 16, there is also provided a locating guide 32 secured or defined on the upper surface of the intermediate table 14 and positioned generally parallel to the guide tracks 20 thereon. The locating guide 32 is provided with a plurality of locating apertures or openings 33, each adapted selectively to receive the pin 29. Thus when it is desired to move the upper table 16 fore or aft relative to the intermediate table 14, it is merely necessary to pivot the movable handle 26 downwardly from the position illustrated in solid lines in FIG. 6 to the position illustrated in phantom therein, thereby removing the locating pin 29 from the locating openings 33 and releasing the upper table 16. The table 16 may then be positioned in a fore-or-aft direction until the pin 29 aligns with the desired one of the locating openings 33 in the locating guide 32, at which time the handle 26 may be released so as to return to its normal or at rest position under the force of a compression spring 34.

For moving transversely the intermediate table 14 which carries the upper table 16, there is provided suitable power means, here illustrated as a fluid cylinder 37, FIG. 4. As well known, the fluid cylinder 37 includes a plunger 38 to which is connected a rack gear 39. A complementary confronting rack gear 40 is defined or secured to the lower surface of the intermediate table 14 and is operatively connected to the rack gear 39 by an idler gear 44. Thus movement of the rack gear 39 in a first transverse direction is effective to move the intermediate table 14 thereby moving the upper table 16 in the opposite transverse direction. Suitable controls such as foot pedals are provided for the operator to control the actuation of the fluid cylinder 37. The intermediate table 14 will move transversely in response to actuation of the fluid cylinder 37 until such time as suitable adjustable stop bolts 41 strike against stop members secured to the machine tool, indicated as 42 in FIGS. 2 and 4. The stop bolts 41 may be adjusted to control the transverse travel of the intermediate table 14. The table 14 is securely held in the desired limiting position by the force of fluid in the fluid cylinder 37.

It will be understood that although in the illustrated embodiment the intermediate table 14 is illustrated as having merely two transverse positions, it is possible to provide any number of transverse positions by adding movable gauge blocks seatable against the gauge surface 42a of the stop members 42. Such gauge blocks may automatically be inserted into or withdrawn from the path of the stop bolts 41 by suitable controls such as additional fluid cylinders.

Since the locating pin 29 is comparatively light, and since considerable thrust may be applied by the machine tool on a workpiece, it is necessary to securely fix the upper table 16 to the intermediate table 14, at least during certain machining operations in order to prevent transmission of thrust loads on the pin 29. To this end there is provided a pair of electromagnets 45, FIGS. 4, 8 and 9, extending from the upper surface of the intermediate table 14. Each of the electromagnets 45 is annular in shape having a frame 46 of U-shaped cross section, the legs 46a, 46b of which define the poles of the electromagnet. An electric winding 47 is provided of generally annular shape and positioned within the U-shaped structure 46. A ring-shaped layer of nonmagnetic friction material 48, such as of asbestos, extends across the open end of the frame 46 and projects beyond the ends of the poles 46a, 46b. The electromagnet 45 is adapted, when energized, to lock against a magnetizable portion on the under surface of the upper table 16, the friction material 48 thereby being magnetically biased against the bottom of the upper table 16 to secure the upper table 16 fixed with the intermediate table 14.

Suitable means are provided for positioning and holding work on the machine tool table 10. In a desired application of the machine tool table, the machine tool table is adapted to hold comparatively thin or sheet plate material. To this end there is provided a corner guide 52, FIG. 1, and back stop guides 53. Additionally there is provided a pair of fluid-actuated holddown clamps 54, FIGS. 1 and 10, including a fluid cylinder 55, FIG. 10, under the control of the operator.

To provide for automatic release of the electromagnetic locking force when it is desired to move the upper table 16 relative to the intermediate table 14, there is provided a suitable control circuit, best illustrated in FIGS. 7 and 11, including a limit switch 58, normally open, and closed when the movable handle 26 is pivoted downwardly. Closure of the limit switch 58 closes an electric circuit including a brush-type contact 59 in the intermediate table 14 and a sliding contact member 60 spaced by suitable insulation 61 from the bottom surface of the upper table 16. The limit switch 58, when energized, energizes a relay 62, normally closed, to open the circuit from the windings 47 of the electromagnets 45, thereby releasing the magnetic locking force between the tables 14 and 16. After the upper table 16 is moved to the desired position, return of the movable handle 26 to its normal position locates the locating pin 29 within a locating opening 33, and at the same time opens the limit switch 58, which operation deenergizes the relay 62 and reestablishes the electromagnetic circuit. By insertion of a rheostat in the circuit to the magnetic windings 47, the holding force of the magnets may be varied so that a light holding force is provided for drilling or light grinding or milling operations, and a heavy or high-holding load is provided for heavy cutting or grinding operations. Moreover, a closed electrical circuit to the switch 58 may readily be provided merely by the addition of another brush and sliding contact assembly to replace the grounded return illustrated in FIG. 11.

It will be seen from the above detailed description that there is provided a machine tool table having an improved locking arrangement, which may have an infinite number of fore-and-aft positions as desired, and a multiple number of transverse positions. Advantageously the use of electromagnets as a locking medium between the tables eliminates prior methods of applying weights to the table or otherwise locking the tables. The load to the locking magnets is automatically applied by return of the control handle to its normal or operative position. Moreover the magnets are effective to minimize vibrations, to provide a secure and tight grip between the parts.

Although the present invention has been described by reference to only a single embodiment thereof, it will be apparent that numerous other modifications and embodiments will be devised by those skilled in the art which will fall within the true spirit and scope of the present invention.

I claim:

1. A machine tool table adapted for multiple positioning in a horizontal plane comprising: a base member adapted to be secured to a machine tool and provided with guide means on its upper surface; an intermediate table member having guide elements on its lower surface cooperatively associated with said guide means for providing horizontal movement thereof in a first horizontal direction and further provided with guide means on its upper surface transverse to the first-mentioned guide means; an upper table member having guide elements on its lower surface cooperatively associated with the second-mentioned guide means providing horizontal movement thereof in a second horizontal direction; stop means limiting the travel of said intermediate table member; locating means including a locating guide with a plurality of locating openings therein mounted on one of said table members for positioning said upper table member in a plurality of positions relative to said intermediate table member; electromagnetic locking means for securing said upper table member fixed relative to said intermediate table member in each of said plurality of positions; and handle means for moving said upper table member actuatable to release said pin and simultaneously energize said magnetic means.

2. A machine tool table as set forth in claim 1 wherein said magnetic means includes electromagnetic means having an electric winding carried by one table member and operatively positioned to clamp against a surface of magnetizable material of the other table member.

3. A machine tool table as set forth in claim 2 wherein said electromagnetic means includes at least one electromagnet having an annular frame of U-shaped cross section, the legs of said U-shaped structure defining the poles of said magnet, said electric winding being annular and positioned within said U-shaped structure.

4. A machine tool table as set forth in claim 3 wherein said magnet includes a ring-shaped layer of friction material across its open end adapted to be magnetically biased against said surface of magnetizable material.

5. A machine tool table as set forth in claim 2 including means for varying the magnetic force output of said electromagnetic means.

6. A machine tool table as set forth in claim 2 wherein there is provided a brush-type contact and a sliding contact connection between said table members in the electric circuit of said electric winding.

7. A machine tool table as set forth in claim 1 including power means for selectively moving said intermediate table member against said stop means.

8. A machine tool table as set forth in claim 1 wherein said power means includes means for holding said intermediate table member against the selected stop means.

9. A machine tool table adapted for multiple positioning in a horizontal plane comprising:
 a base member adapted to be secured to a machine tool and provided with a pair of parallel guide tracks on its upper surface;
 an intermediate table having guide elements on its lower surface riding on said guide tracks for providing horizontal movement thereof in a first horizontal direction and further provided with a pair of parallel guide tracks on its upper surface transverse to the first mentioned guide tracks;
 an upper table having guide elements on its lower surface riding on the second mentioned guide tracks providing horizontal movement thereof in a second horizontal direction;
 spaced stops limiting the travel of said intermediate table;
 handle means on said upper table providing for gripping said upper table;

a locating guide defined on the upper surface of said intermediate table parallel to the first-mentioned guide tracks provided with a plurality of locating openings;

a pin member engageable in a selected one of said locating openings and removable therefrom by the mere actuation of said handle means;

electromagnetic locking means carried by said intermediate table;

electric control means for said electromagnetic locking means operatively associated with said handle means; and circuit means interconnecting said electromagnetic locking means and said electric control means including a sliding contact carried by said upper table member and a brush-type contact carried by said intermediate table electrically engaging said sliding contact.

10. A machine tool table as set forth in claim 9 including power means for reciprocal movement of said intermediate table between said stops, said power means including a rack gear defined on the lower surface of said intermediate table, a fluid motor carried by said base member including a plunger, a second rack gear connected to said plunger, and an idling gear interconnecting said rack gears.